No. 720,632. PATENTED FEB. 17, 1903.
J. SPENA & C. BEHE.
NUT LOCK.
APPLICATION FILED JULY 2, 1902.
NO MODEL.
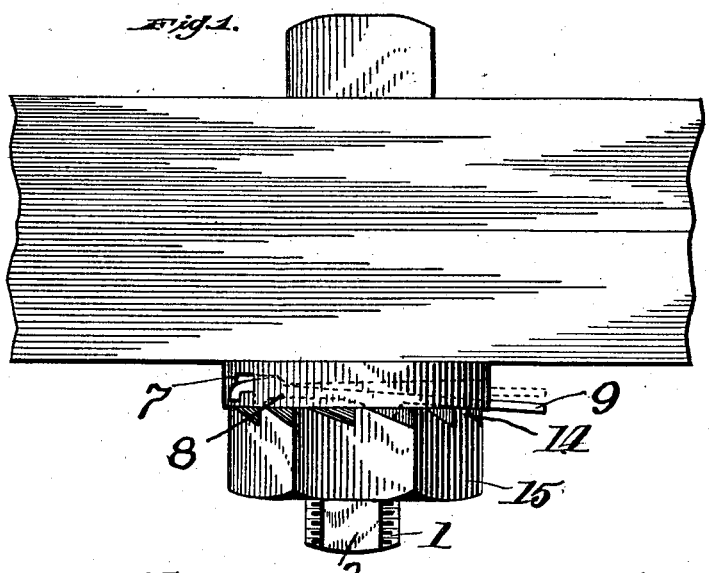
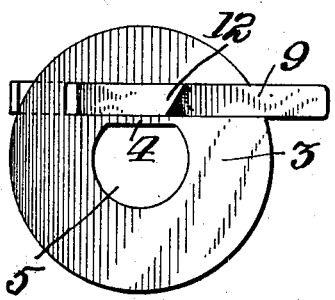
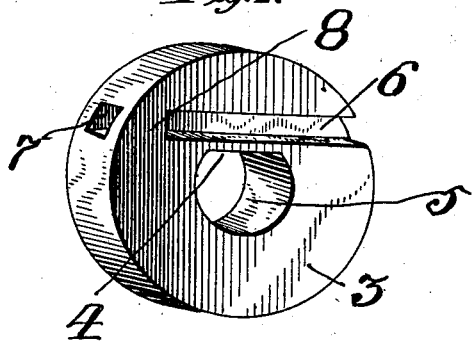
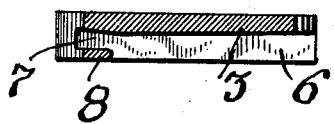
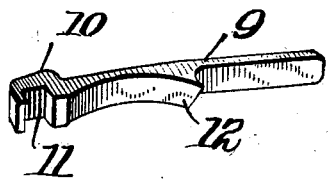

UNITED STATES PATENT OFFICE.

JOSEPH SPENA AND CHRYSOSTOM BEHE, OF LILLY, PENNSYLVANIA.

NUT-LOCK.

SPECIFICATION forming part of Letters Patent No. 720,632, dated February 17, 1903.

Application filed July 2, 1902. Serial No. 114,091. (No model.)

*To all whom it may concern:*

Be it known that we, JOSEPH SPENA and CHRYSOSTOM BEHE, citizens of the United States, residing at Lilly, in the county of Cambria and State of Pennsylvania, have invented a new and useful Improvement in Nut-Locks, of which improvement the following is a specification.

This invention relates to certain new and useful improvements in nut-locks, and has for its object to provide means for effectively securing a nut in position upon a bolt and prevent the accidental displacement thereof.

To this end the invention embodies a bolt provided with a flat face on its threaded portion, a washer provided with a keyway extending across the outer face thereof, an especially-constructed key adapted to lie within said keyway and have its one end extending beyond the washer, and a nut provided on its inner face with ratchet-teeth which are adapted to engage with the teeth or pawl formed on the key. The locking-key is made so that it may be sprung within the keyway sufficiently far to permit the disengagement of the tooth or pawl carried thereby with the ratchet-teeth on the nut, and thus enable the removal of the latter when desired. All this construction will be hereinafter more fully described, and specifically pointed out in the claims, and in describing the invention in detail reference is had to the accompanying drawings, forming a part of this specification, and wherein like numerals of reference indicate like parts throughout the several views, in which—

Figure 1 is a top plan view of our improved nut-lock, showing the same in locked position. Fig. 2 is a plan view of the locking-washer with the spring locking-key in position therein. Fig. 3 is a transverse vertical sectional view of the locking-washer with the locking-key removed. Fig. 4 is a detail perspective view of the locking-washer with the locking-key removed. Fig. 5 is a detail perspective view of the spring locking-key.

To put our invention into practice, we provide a bolt the threaded portion 1 of which is provided with a flat face 2. After this bolt has been placed in position we place upon the bolt a locking-washer 3, which is prevented from turning on the bolt by means of the straight side 4 of the aperture 5 in the washer engaging with the flat face 2 of the bolt. This locking-washer is provided in its outer face with a keyway 6, which extends from one side of the washer to the opposite side, but is not cut entirely through the front face of the said washer, terminating at one end in the aperture 7, thus forming the slot 8 for a purpose that will presently appear. This keyway 6 is adapted to receive the locking-key 9, the one end of which is adapted to extend some distance beyond the periphery of the washer, as shown in Figs. 1 and 2. At its other end this locking-key is provided on its under face with a shoulder 10 and upon its opposite face with a recess 11, the latter being adapted to receive the slot 8 of the washer. The locking-key is further provided with an integral tooth or pawl 12, which is adapted to engage with ratchet-teeth 14, formed on the inner face of the nut 15. The locking-key will lie in position in the keyway, as shown in full lines of Fig. 1, in which position the tooth or pawl projects beyond the outer face of the locking-washer 3. As the nut 15 is tightened the teeth 14 thereon will ride over the tooth or pawl 12, depressing the locking-key within the keyway during the passage of each tooth of the nut. The key, by reason of its being composed of springy or resilient metal, assumes its normal position, as shown in full lines of Fig. 1, on the passage of each tooth of the nut, thus preventing the backward turning of the nut unless the locking-key is depressed within the keyway, as shown in dotted lines in Fig. 1 of the drawings, which operation will draw the tooth or pawl 12 within the keyway and allow the ready removal of the nut. The locking-key is securely held in position by reason of its being engaged at the inner end with the wall 8 of the locking-washer and can only be removed from the locking-washer by first removing the nut. Since the washer is held against rotation upon the bolt by the flat face of the latter, it will be observed that the nut is securely fastened and may only be removed by depressing the locking-key within the keyway.

It will be noted that various changes may be made in the details of construction without departing from the general spirit of our invention.

Having fully described our invention, what we claim as new, and desire to secure by Letters Patent, is—

1. The combination with a bolt having a flat face on its threaded portion, of a locking-washer held on the bolt against rotation by said flat face and having a keyway in its outer face, a spring locking-key adapted to lie in said keyway with its one end extending beyond the periphery of the locking-washer, and a nut having ratchet-teeth on its inner face to engage with the pawl or tooth carried by the locking-key, substantially as described.

2. In a nut-lock, the combination with a bolt having a flat face, of a locking-washer mounted on said bolt and held against rotation thereon, said locking-washer having a keyway in its outer face, a spring locking-key adapted to fit in said keyway and held against displacement at one end thereof with its other end extending beyond the periphery of the locking-washer, and a nut having ratchet-teeth to engage with said locking-key to hold the nut against backward movement, substantially as described.

3. In a nut-lock, the combination of a bolt, a locking-washer mounted on said bolt and held against rotation thereon, a spring locking-key arranged in the outer face of said locking-washer with its one end extending beyond the periphery of the washer, and a nut having ratchet-teeth on its inner face to engage with said locking-key, substantially as described.

In testimony whereof we have hereunto signed our names in the presence of two subscribing witnesses.

JOSEPH SPENA.
CHRYSOSTOM BEHE.

In presence of—
JAMES C. KAINEY,
JOHN A. LEAP.